United States Patent
Köpf et al.

(10) Patent No.: US 12,447,240 B2
(45) Date of Patent: Oct. 21, 2025

(54) PREPARATION OF FIBROIN AND THERAPEUTIC PRODUCTS MADE THEREOF

(71) Applicant: Fibrothelium GmbH, Aachen (DE)

(72) Inventors: Marius Köpf, Erkelenz (DE); Alexander Kopp, Aachen (DE); Aleksander Drinic, Herzogenrath (DE)

(73) Assignee: Fibrothelium GmbH, Aachen (DE)

( * ) Notice: Subject to any disclaimer, the term of this patent is extended or adjusted under 35 U.S.C. 154(b) by 896 days.

(21) Appl. No.: 17/269,611

(22) PCT Filed: Aug. 23, 2019

(86) PCT No.: PCT/EP2019/072590
§ 371 (c)(1),
(2) Date: Feb. 19, 2021

(87) PCT Pub. No.: WO2020/039070
PCT Pub. Date: Feb. 27, 2020

(65) Prior Publication Data
US 2021/0338907 A1    Nov. 4, 2021

(30) Foreign Application Priority Data

Aug. 23, 2018 (DE) .................... 10 2018 214 308.0

(51) Int. Cl.
| | | |
|---|---|---|
| *A61L 31/04* | (2006.01) | |
| *A61K 33/44* | (2006.01) | |
| *A61K 38/17* | (2006.01) | |
| *A61L 31/02* | (2006.01) | |
| *A61L 31/16* | (2006.01) | |
| *B33Y 80/00* | (2015.01) | |

(52) U.S. Cl.
CPC ............ *A61L 31/046* (2013.01); *A61K 33/44* (2013.01); *A61K 38/1767* (2013.01); *A61L 31/028* (2013.01); *A61L 31/047* (2013.01); *A61L 31/16* (2013.01); *B33Y 80/00* (2014.12); *A61L 2430/34* (2013.01)

(58) Field of Classification Search
CPC .... A61K 2300/00; A61K 31/66; A61K 33/44; A61K 38/1767; A61L 24/0036; A61L 24/0084; A61L 24/02; A61L 24/108; A61L 2430/34; A61L 31/028; A61L 31/046; A61L 31/047; A61L 31/16; A61P 17/02; B33Y 80/00
See application file for complete search history.

(56) References Cited

U.S. PATENT DOCUMENTS

| | | | | |
|---|---|---|---|---|
| 4,761,213 A | * | 8/1988 | Hosten ................ | C23G 3/00 204/198 |
| 7,671,178 B1 | | 3/2010 | Phillips et al. | |
| 9,907,879 B2 | * | 3/2018 | Thauern ............... | A61L 24/08 |

FOREIGN PATENT DOCUMENTS

| | | | | | |
|---|---|---|---|---|---|
| CN | 105617463 A | * | 6/2016 | ............ | A61L 27/26 |
| CN | 106362208 | | 2/2017 | | |
| CN | 106362208 A | * | 2/2017 | ............ | A61K 47/36 |
| GB | 2559163 | | 8/2018 | | |
| JP | 2007169171 | | 7/2007 | | |
| WO | 2009104005 | | 8/2009 | | |
| WO | 2015063190 | | 5/2015 | | |

OTHER PUBLICATIONS

Effects of Microwave Radiation on Selected Mechanical Properties of Silk; E. Reed; https://escholarship.org/uc/item/7fj44148.
Polyphosphate enhances fibrin clot structure S. Smith et al; Blood, Oct. 1, 2008—vol. 112, No. 7.
Preparation and hemostatic property of low molecular weight silk fibroin; C. Lei et al, Published in 2016.
Regenerated silk materials for functionalized silk orthopedic devices by mimicking natural processing; C. Li et al; Biomaterials. Dec. 2016; 110: 24-33. doi: 10.1016/j.biomaterials.20J6.09.014.
Biocompatibility and safety evaluation of a silk fibroin-doped calcium polyphosphate scaffold copolymer in vitro and in vivo; H. Xie et al; RSC Adv., 2017, 7, 46036.
Decellularized silk fibroin scaffold primed with adipose mesenchymal stromal cells improves wound healing in diabetic mice; Navone et of. Stem Cell Research & Therapy 2014,5:7 http://stemcells.com/contents/5/1/7.
Preparation and characterization of silk fibroin as a biomaterial with potential for drug delivery; Zhang eta/. Journal of Translational Medicine 2012, 10:117 http://www.translational-medicine.com/content/10/1/117.
German Office Action dated Mar. 21, 2019, includes some English portions.

* cited by examiner

*Primary Examiner* — Jeffrey T. Palenik
(74) *Attorney, Agent, or Firm* — Renner, Kenner, Greive, Bobak, Taylor & Weber

(57) ABSTRACT

A medical device includes fibroin and a polyphosphate salt including a polyphosphate and a salt counter ion. The fibroin is derived from Lepidoptera and the medical device is selected from spun or knitted fibers, non-woven, woven, sponge, foam, membrane, film, 3D scaffold, particles, and powders.

15 Claims, No Drawings
Specification includes a Sequence Listing.

```
SEQUENCE LISTING

<160> NUMBER OF SEQ ID NOS: 1

<210> SEQ ID NO 1
<211> LENGTH: 6
<212> TYPE: PRT
<213> ORGANISM: Bombyx mori
<220> FEATURE:
<223> OTHER INFORMATION: repeat of fibroin heavy chain

<400> SEQUENCE: 1

Gly Ala Gly Ala Gly Ser
1               5
```

PREPARATION OF FIBROIN AND THERAPEUTIC PRODUCTS MADE THEREOF

SEQUENCE LISTING

The sequence listing file entitled "sequencelisting" having a size of 429 bytes and a creation date of Feb. 11, 2021, that was filed with the patent application is incorporated herein by reference in its entirety.

FIELD OF THE INVENTION

The invention relates to the use of a polyphosphate salt as procoagulant mediator agent in medical devices or pharmaceutical compositions. It further relates to a method of preparing a fibroin solution. The invention further comprises subsequent process steps leading to solidified fibroin products and to the use of said products for medical treatment.

BACKGROUND OF THE INVENTION

Silk protein has been used for manufacturing clothing and drapery for thousands of years. It was rather recently that the use of silk protein in biochemical and medical applications was scientifically investigated. Hereby, its strength, which is comparable to Kevlar, and high elasticity, together with its excellent biocompatibility and low immunogenicity are key characteristics for its use in medicine. Moreover, silk fibroin can self-assemble into mechanically robust material structures that are also biodegradable and non-cytotoxic. As a result, silk protein and especially its major component fibroin has drawn considerable attention as novel biomaterial.

Due to its unique properties, silk protein is envisaged for a broad range of medical application such as scaffolding for tissue repair and tissue engineering, drug delivery vehicles, sensors for biomarkers and antimicrobial coatings. For review see e.g. Zhang et al. (Acta Pharm Sin B, 2018, 8(1): 34-50. "Biomolecules as carriers in drug delivery and tissue engineering") and Farokhi et al. (Trends in Biotechnology "Overview on silk fibroin use in wound dressings", 2018; May 12, S0167-7799(18)30117-3).

Silk fibroin is a fibrous protein whose hierarchical structure consists of fibrils and micro-fibrils, in which the fibers are arranged in a highly oriented crystalline form. The silk fibers produced by the domestic silkworm, *Bombyx mori*, are 10-25 mm in diameter and comprise a light chain (approx. 26 kDa) and a heavy chain (approx. 390 kDa) in a 1:1 ratio, linked by a disulfide bond. The heavy chain is amphiphilic with hydrophobic and hydrophilic sequences. The hydrophobic domains contain repeats of Gly-Ala-Gly-Ala-Gly-Ser, which form crystalline structures, while the hydrophilic region comprises shorter and nonrepetitive structures containing polar and bulky sidechains.

In the prior art, fibroin is commonly obtained from natural silk with the so-called "scouring" or "degumming" treatment, which includes the removal of the sericin layer covering the fibroin by treatment in hot water (60-120° C.) with addition of alkali (soaps), acids or enzymes. Thereafter, the fibroin is solubilized in an aqueous solvent, and subject to further purification steps such as filtration, dialysis and solvent removal. Since the preparation methods of the prior art makes use of rather harsh conditions (acids, alkali, high temperatures) this can impair the quality of the fibroin protein. Furthermore, the substantial amount of solvent required for the solubilization of the fibroin protein requires an elaborate procedure of solvent removal in later process steps.

Hence, there is still a need for an improved preparation methods of silk fibroin using raw silk as source material. The objective of the present invention thus is to provide a method of silk protein preparation which overcomes at least one of the above-mentioned disadvantages.

This problem is solved by provision of a preparation method according to claim 1. Specific embodiments are subject matter of further independent claims.

SUMMARY OF THE INVENTION

In a first aspect the present invention provides a method for preparing an aqueous fibroin solution comprising the following steps:
(a) provision of raw silk containing fibroin and sericin;
(b) removal of the sericin;
(c) solubilization of the fibroin by addition of a solvent and applying microwave radiation under a pressure of >1 atm;
(d) removal of the salt.

The production method of the present invention has several advantages over the fibroin preparation methods known in the prior art.

By using a high-pressure microwave treatment for solubilising the silk-derived fibroin the inventors found out that this enables a reduction in the amount of solvent. Since the solvent must be removed in subsequent production steps in order to come to a solidified product, this represents a considerable improvement of the production process. It is to note that the common process for solvent reduction, namely the boiling process, has the disadvantage that it can lead to thermal degradation of the fibroin protein.

Hence, a reduction of the initial amount of solvent leads to a fibroin protein and product with higher quality.

Importantly, the microwave treatment leads to an improved fibroin solubilization so that a boiling of the solution is not necessary.

Furthermore, the process temperature in the microwave treatment can be set in a precise and reproducible manner.

In addition, the microwave treatment did not require continued examination and therefore enables the establishment of an automated procedure which can be easily upscaled to larger batch sizes.

The present product method can be easily adapted to the specific requirements of the fibroin characteristics.

Since the preparation method of the invention is based on known components, it can be easily produced in a cost-efficient manner.

DETAILED DESCRIPTION OF THE INVENTION

The raw silk as the fibroin-containing starting material of the preparation method can be derived from any silk-producing animal. In a preferred embodiment the raw silk is derived from Lepidoptera such as *Bombyx mori*, *Anteraea pemyi*, *Antheraea yamamai* or *Philosoamia ricini*, arachnids such as *Nephila clavipes* or other insects.

In a further preferred embodiment of the invention the raw silk is derived from the silkworm *Bombyx mori*.

In order to obtain a purified fibroin, it is necessary to remove the sericin. Sericin is a family of glycoproteins generated by alternative splicing of sericin genes and acts as an adhesive joining of two fibroin filaments in order to form silk yarn. The molecule is highly hydrophobic with a molecular weight that ranges from 20 to 400 kDa and consists of 18 amino acids, including essentials. Structurally, sericin is a globular protein consisting of random coil and β-sheets. Changes in random coil structure for β-sheet easily occur in response to mechanical stretching properties, moisture absorption, and temperature, where the sol-gel transition occurs. In hot water, 50-60° C. or higher, the protein adopts its soluble form. At lower temperature, the solubility is reduced, and the random coil structure is converted into β-sheets, resulting in the formation of a gel. For *Bombyx mori*, Sericin contributes to about 20-30 percent of total cocoon weight.

In the context of the present invention, the removal of sericin, which is also known as "degumming" includes the partial as well as the complete removal of sericin.

The removal of the sericin in step (b) of the preparation method of the invention is suitably performed by one or more wash steps using an alkaline aqueous solution. In a preferred embodiment this alkaline washing solution is an aqueous $Na_2CO_3$ solution; an aqueous $NaHCO_3$ solution; or an aqueous solution containing an alkali-free soap.

Preferred is a ratio of 200 to 250 ml alkaline washing solution per 1 gram of silk. Incubation time is preferably between 30 and 120 minutes and more preferably between 60 and 90 minutes.

In one embodiment, the solvent for the fibroin solubilization as performed in step (c) of the preparation method of the invention is selected from list consisting of a water alcohol mixture, preferably further containing an inorganic salt such for example LiBr or $CaCl_2$; an aqueous LiBr solution; formic acid; 1,1,1,3,3,3-hexafluoro-2-propanol; trifluoracetic acid; and an ionic liquid.

The ionic liquid is preferably selected from the list consisting of 1-ethyl-3-methylimidazolium chloride, 1-butyl-3-methylimidazolium chloride, 1-ethyl-3-methylimidazolium acetate, 1-ethyl-3-methylimidazolium glycine, 1-allyl-3-methylimidazolium chloride, 1-butyl-2,3-dimethylimidazolium chloride, 1-butyl-3-methylimidazolium bromide and mixtures among these solvents and/or with water; the preferred ionic liquids for the purposes of the invention are 1-ethyl-3-methylimidazolium chloride, 1-butyl-3-methylimidazolium chloride, 1-ethyl-3-methylimidazolium acetate and 1-ethyl-3-methylimidazolium glycine.

In a preferred embodiment of the invention, the solvent is a three-component solution consisting of water, $CaCl_2$ and ethanol. Suitably, the three-component solution has a molar ratio of $m(CaCl_2)<m(water)<m(ethanol)$. The three-component solution preferably consists of $CaCl_2$:water:ethanol in a molar ratio of 0.5-1.5:1.5-3.0:5-10 and more preferably of 1:2:8. This corresponds to a weight ratio of 110.66 g:93.66 g:144.12. The weight ratio for these three constituents can vary as follows: water between 140-150 g, $CaCl_2$ between 100-120 g, and ethanol between 90-100 g.

In another embodiment, the weight ratio between the degummed fibroin and the above stipulated three-component solution is between 1:9 and 1:19.

According to the invention the solubilization in step (c) of the preparation method makes use of microwaves irradiating the fibroin-solvent mixture.

In a preferred embodiment of the invention said microwave treatment in step (c) is performed by using at least one of the following treatment parameters:

Use of an output power in a range between 10 and 1000 W, more preferably between 20 and 200 W, even more preferably between 50 and 100 W and specifically between 75 and 90 Watt per 25 L of effective volume;

Use of an output power suitable to generate a temperature of the fibroin-solvent mixture of between 75° C. and 90° C., whereby the temperature is preferably between 80 and 90° C., Stirring for a period of between 20 and 60 min, more preferably between 25 and 60 min and even more preferably between 30 and 45 min, or Treatment under a pressure in a range of between 10 and 100 atm, more preferably between 10 and 80 atm and even more preferably between 20 and 50 atm.

In a preferred embodiment, the step of microwave-induced fibroin solubilization at between 75° and 90° C., being preferably between 80° and 90° C. is followed by a cooling step by incubating the solution at a temperature which is lower than the previous solubilization temperature and higher than room temperature. This cooling step is preferably performed at a temperature in the range between 40 and 60° and more preferably is 50° C.

The cooling step incubation is preformed for a time period of between 15 and 45 min and preferably for 30 minutes.

In a preferred embodiment the fibroin solution is cooled down to room temperature after the cooling step or the microwave-induced fibroin solubilization step, respectively.

In one embodiment the fibroin solution as resulting from the microwave treatment has a concentration of between 0.5 and 75%, preferably of between 1 and 55%, more preferably of between 1.5 and 12% or between 40 and 50%.

The fibroin solution can be further purified by centrifugation. Preferred is a centrifugation at 3000 to 4000 rpm for 5 to 30 minutes.

According to the invention the fibroin solution as prepared in step (c) is desalted in order to obtain a low-salt or salt free solution. This can be done by any desalting method known from prior art, whereby dialysis, ultrafiltration or gel filtration are preferred. In dialysis and ultrafiltration, a separation membrane with a molecular weight cutoff (MWCO) of between 6 and 8 KDa is preferred.

The desalted fibroin solution is suitably concentrated by solvent removal. This is typically done by boiling of the fibroin solution at 10 to 70° C., preferably at 50-70° C. and more preferably at 60° C. under continuous stirring or agitation.

In one embodiment of the invention the desalted fibroin solution as resulting from step (d) of the preparation method is subjected to addition of a procoagulant agent, which preferably comprises sodium polyphosphate. The inventors made the novel and surprising finding that sodium polyphosphate ($Na(PO_3)_n$ with $n≥3$) has procoagulant properties and to its insolubility in water is suitable as a long term acting procoagulant agent for use in fibroin containing product.

In another embodiment of the invention the desalted fibroin solution is processed to a fibroin containing structure by a method selected from the list consisting of electrospinning; wet spinning; dry spinning; freeze-drying; molding; electro-blowing; laminating to a further layer; or additive manufacturing such as for example 3D-printing.

In a further embodiment of the invention the desalted fibroin solution is processed to a fibroin containing structure by a salt leaching or foaming.

The production of a fibroin-containing structure by electrospinning based on the desalted fibroin solution is performed by using at least one of the following process parameters:

Use of a desalted fibroin solution with a fibroin concentration between 30-60 wt.-% and preferably between 40 and 50 wt.-%, Ejecting the fibroin solution with a syringe having a volume between 1.5 and 100 mL and preferably between 20 and 50 mL, Using a cannula with a diameter between 0.2 and 1 mm and preferably between 0.4 to 0.8 mm, At a process temperature between 10 and 80° C. and preferably between 20 and 50° C., The electrospinning is performed at a relative humidity of between 5 and 40% and preferably between 10 and 30%, The flow rate is kept between 0.1 mL and 3 mL/h and preferably between 0.1 and 1 mL/h.

When generating the fibroin containing structure it is—according to one embodiment of the invention—preferred to increase the crystalline part of the generated fibroin structure. This is accomplished by incubation of the fibroin structure in an organic solvent, which is preferably alcohol and more preferably methanol.

Hereby, it is to note that normal manufacturing processes lead to the formation of structures with proteins that exhibit the "random-coil" form with reduced water-resistance and poor mechanical properties. Hence, it is essential for the fibroin used in scaffold design to have a β-sheet formation. The mechanical properties can be further modulated by varying the fibroin precipitation method (also called "coagulation") and/or the final treatment of the fibroin product, because these processes can influence the ratio between the crystalline β-sheet domains and the amorphous random-coil domains.

The post crystallization of the fibroin product in alcohol, which is preferably methanol, is performed in an alcohol-water mixture with 80 to 100% (v/v) of alcohol and preferably contains 90% (v/v) of alcohol. The product is incubated in this mixture for 10 to 45 minutes and preferably for 30 minutes.

When generating the fibroin containing product, the skilled person can choose from a great variety of products. Hereby, preferred products are a non-woven, a sponge, a membrane, a 3D scaffold; a hydrogel and a powder.

Fibroin sponges are 3D-scaffolding structures with interconnected pores obtained from fibroin solutions by methods such as e.g. freeze drying, "salt leaching" or "gas forming".

The fibroin products disclosed above can be obtained by different procedures preferably by use of alcohol to convert the fibroin from a random-coil to a β-sheet conformation. This change in conformation produces water-insoluble fibroin structures.

In a preferred embodiment, the fibroin is used for generation of a 3D scaffold for 3D cell cultivation or tissue replacement. Such a scaffold can resemble natural endogenous scaffolds and can be used for the in vitro-proliferation of cells that are difficult to be cultured, for tissue and organ reconstruction and antitumor drug screening.

In a further preferred embodiment, the fibroin is used for additive manufacturing which is preferably 3D-printing. Examples for 3D-printing methods are Three Dimensional Printing, Fused Deposition Modeling, Selective Laser Sintering, Stereolithography, and 3D Plotting/Direct-Write/Bioprinting. For 3D printing further additives are typically added to the fibroin solution to allow one-step gelation of silk fibroin. As an example, the 3D-printing could be performed by using a fibroin suspension containing synthetic nanoclay (Laponite) and polyethylene glycol (PEG). In another embodiment, the fibroin solution as used for 3D printing is without additives.

The 3D scaffold can be obtained through gradient freezing of a product of the reaction between the fibroin and crosslinking agents. Preferred crosslinking agents are 1-ethyl-3-(3-dimethylaminopropyl)carbodiimide (EDC) and N-hydroxy-succinimide (NHS).

In a referred embodiment a further polymer is added to the freezing solution to become constituent of the scaffold. Preferred polymers are chitosan, collagen, gelatin or polyethylene glycol.

The fibroin hydrogel as disclosed above is a semisolid form. A semisolid hydrogel is a swollen colloid solvated by a large amount of water and does not possess a 3-dimensional characteristic comparable to those of a sponge.

In a further embodiment the fibroin as produced by the method of the invention can be used for preparation of an ointment. Due to the known interfacial activating effect of fibroin, an ointment preparation can be stably formed using the isolated fibroin, an oil-based component and a water-based component without using a surfactant.

In a second aspect the invention provides a medical device comprising fibroin and sodium polyphosphate as procoagulant mediator. As depicted above the sodium polyphosphate was discovered to have procoagulant effects and due to its insolubility provides an in vivo sustained procoagulant effect.

In a preferred embodiment the sodium polyphosphate is a polymeric sodium metaphosphate which is also known as "Maddrell's salt". This salt can be present in the low temperature form as a linear polyphosphate $Na_nH_2P_nO_{3n+1}$ with a chain length of n=16-32 or in the high temperature form with a chain length of n=36-72. In a further embodiment the linear polyphosphate has a chain length of n=65-100.

In a further embodiment, the linear polyphosphate, having preferably a chain length of n=65-100, is provided in form of nanoparticles composed of said polyphosphate and divalent metal ions.

In an alternative embodiment, the polyphosphate is provided as a cross-linked polyphosphate.

In a further embodiment the polyphosphate is a metaphosphate, whereby the phosphate groups form a ring. Preferred examples are the trimetaphosphate or the hexametaphosphate as shown below:

Trimetaphosphate: 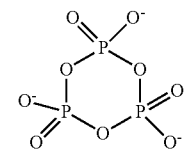  Hexametaphosphate: 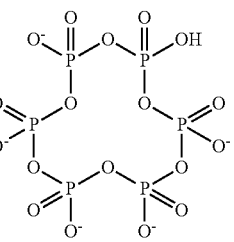

In an alternative embodiment the polyphosphate is an ultraphosphate as a highly condensed phosphate structure consisting of interconnected phosphate rings, interconnected linear chains or a mixture of both.

In another embodiment, the above disclosed polyphosphate can be used not only with sodium as counter ion but with any pharmaceutically acceptable counter ion. Preferred examples are selected from the group consisting of sodium, potassium, calcium, magnesium, ammonium, benzathine, chloroprocaine, choline, diethanolamine, ethanolamine, ethylendiamine, lysine, histidine, meglumine, procaine, trimethylamine, aluminium, iron, zinc and lithium, whereby the salt counter ion is preferably sodium.

To the fibroin-containing medical device, one or more bioactive agents may be added including growth factors, drugs, cells, antibiotics, antiviral agents, enzymes, vitamins, etc., which are thus integrated in the medical device and can then be released from the same at the implantation site, in order to promote the regenerative processes of the body area said device is intended for.

The implantable medical devices of the invention are mainly used as scaffolds for repairing human and animal tissues and organs with regenerative medicine approach. Among the target tissues and organs we may mention, among the others, tissues of the peripheral nervous system (such as peripheral nerves), vascular system (such as veins, arteries, arteriovenous fistulas for vascular access), cardiovascular system (such as coronary arteries and the heart muscle), central nervous system (such as spinal cord), skin and its layers, containment and protection tissues of internal organs (such as dura mater, pericardium, pleura, peritoneum), tissues of the musculoskeletal system (such as tendons, ligaments, muscles) and devices for the containment of hernias and prolapses.

The shape and size of the device depend on the target tissue or organ; below are listed the rough shapes and sizes of devices intended for some of the purposes mentioned above and achievable using the fibroin-containing medical devices of the invention, but other possible uses (and the shapes and sizes of relevant devices) will be apparent to the man skilled in the art:

tubular devices with inner diameter of between 2 mm and 8 mm and wall thickness of between 0.2 mm and 4 mm in the case of peripheral blood vessels;

tubular devices with inner diameter of between 1 mm and 6 mm and wall thickness of between 0.2 mm and 1 mm in the case of peripheral nerves;

solid cylindrical devices with outer diameter of between 2 mm and 15 mm in the case of tendons and ligaments;

planar devices with thickness of between 0.1 mm and 5 mm in the case of the skin and its layers;

planar devices with thickness of between 0.05 mm and 2 mm in the case of containment and protection tissues of internal organs such as dura mater, pericardium, pleura, peritoneum;

planar devices with thickness of between 0.05 mm and 2 mm in the case of devices for the containment of hernias and prolapses.

In a preferred embodiment the fibroin of the sodium polyphosphate containing medical device of the invention is produced according to the production method of the invention.

In a third aspect, the invention relates to the use of sodium polyphosphate, such as sodium metaphosphate or sodium ultraphosphate as a procoagulant mediator in medical devices or pharmaceutical compositions.

In a fourth aspect, the invention provides a product comprising the fibroin or fibroin-containing structure which is obtainable or produced according to the production method of the present invention. Hereby, it is preferred that the product is an electrospun non-woven.

In another embodiment, said electrospun non-woven has a porosity of between 50 and 90%, preferably between 60 and 85% and more preferably between 70 and 80%.

In a further aspect the invention provides the fibroin product, whereby the fibrin is obtainable or produced according the preparation method of the invention, for use as implantable biodegradable membrane especially for separating biological tissues.

It is to note that the biodegradability depends on the form of the fibroin product and the site of implantation. For example, fibroin fibers used in suture threads a biodegradable in the medium or long term (month or years), whereas regenerated materials such as membranes, gels or nanofibers degrade in the medium to short term (days or weeks). In view of its protein nature, fibroin is liable to enzymatic degradation by the tissue proteases.

By incubation of the fibroin structure in an alcoholic solution, preferably comprising methanol or ethanol, the crystallinity of the generated fibroin structure can be modified in a controlled manner and thereby also the biodegradability of the fibroin product which depends on the crystalline portion of the fibroin.

In another aspect, the invention provides a product comprising the fibroin obtainable or produced according to the production method of the present invention, wherein the product is a biodegradable wound-healing sponge for use in the treatment of wounds.

The polyphosphate in its use in a medical device or a pharmaceutical composition and preferably in a medical device or a pharmaceutical composition comprising fibroin promotes wound healing caused by surgical operation, cutting, injury, abscess, dermatitis, etc., with suppression of scaring and can accordingly be used in the treatment of the above listed indications.

In a further aspect of the invention the polyphosphate is immobilized for example by but not limited to physically or chemically or enzymatically means. The physical entrapment can for example either be by but not limited to dispersion, emulsification, coacervation, absorption, adsorption, gelation, encapsulation or adhesion or chemically for example by but not limited to Van der Waals binding, ionic binding, covalent binding (for example by but not limited to phosphoramidate bond, ester linkage, carboxylic acid linkage, or another form of linkage) or enzymatically or by combinations of the mentioned immobilization techniques.

Also, polyphosphate salts in which hydrogen atoms of the hydroxy groups of the straight-chain polyphosphates are replaced by metals are useful. In this regard, sodium and potassium are found to be suitable for maintaining the therapeutic effect.

In accordance with the present invention, polyphosphate may be in a form of liquid, powder, gel or spray for application. As for the liquid application form, it may employ a harmless solvent selected from distilled water, physiological saline, buffers, etc.

The cations of the crystalline polyphosphates are preferably alkali metal, alkaline earth metal, metal or ammonium ions independently selected especially from Na+, K+, NH4+, Ca2+, Mg2+, Zn2+, Sn2+, Fe3+ and Al3+, preferably from Na+, K+, NH4+ and Ca2+.

In a preferred embodiment of the invention, all cations of the polyphosphate according to the invention are selected from Na+, K+, Ca2+ and NH4+ and more particularly from Na+, K+ and NH4+. Particularly preferably, all cations of the polyphosphate are either Na+, K+, Ca2+ or NH4+ and more particularly Na+, K+ or NH4+, i.e., the polyphosphate does not contain different cations.

The crystalline-form polyphosphates according to the present invention can be prepared by means of methods which are known from the prior art and which are, for example, described by K. Schrödter et al. in: Ullmann's Encyclopedia of Industrial Chemistry, "Phosphoric Acid and Phosphates", pages 32-41, 2008 (7th edition), New York, N.Y., Wiley-VCH Verlag. For instance, crystalline sodium polyphosphates such as Kurrol's salt and Maddrell's salt can, for example, be prepared by annealing amorphous, glassy sodium polyphosphate, which on its part can be prepared by heating sodium dihydrogen phosphate and sodium hydrogen phosphate with release of the water of condensation and then quenching the melt obtained. Crystalline potassium and calcium polyphosphates can be prepared in a similar manner, for example by heating $KH_2PO_4$ or $Ca(H_2PO_4)2$. By contrast, crystalline ammonium polyphosphates can, for example, be prepared by reacting phosphoric acid with ammonia-releasing compounds, such as urea, melamine or methenamine for instance, or alternatively reacting phosphorus pentoxide with diammonium phosphate in ammonia.

In a particularly preferred embodiment of the invention, the crystalline-form polyphosphates are selected from linear sodium polyphosphates, i.e., polyphosphates of the formula A where each M represents $Na^+$, having a number-average chain length of from 15 to 100, preferably from 20 to 80, more particularly from 30 to 60 and specifically from 35 to 55, linear ammonium polyphosphates, i.e., polyphosphates of the formula A where each M represents $NH_4^+$, having a number-average chain length of from 12 to 200, preferably from 17 to 150, more particularly from 20 to 135 and specifically from 22 to 125, linear calcium polyphosphates, i.e., polyphosphates of the formula A where each M represents $½Ca_2^+$, having a number-average chain length of from 8 to 100, preferably from 10 to 60, more particularly from 10 to 40 and specifically from 12 to 25, and linear potassium polyphosphates, i.e., polyphosphates of the formula A where each M represents K+, having a number-average chain length of from 12 to 100, preferably from 18 to 70, more particularly from 22 to 50 and specifically from 25 to 40.

In a further aspect, the invention comprises the following embodiments No. 1 to 19:

1. Use of a polyphosphate salt as procoagulant mediator agent in medical devices or pharmaceutical compositions.
2. Use of a polyphosphate salt according embodiment 1, wherein the salt counter ion is selected from the group consisting of sodium, potassium, calcium, magnesium, ammonium, Benzathine, chloroprocaine, choline, diethanolamine, ethanolamine, ethylendiamine, lysine, histidine, meglumine, procaine, trimethylamine, zinc, tin, iron and lithium, whereby the salt counter ion is preferably sodium.
3. Use of polyphosphate salt according to embodiment 1 or 2, wherein the polyphosphate salt is a polymeric sodium metaphosphate also known as Madrell's salt.
4. Use of a polyphosphate salt according to claim 3, wherein the polymeric sodium metaphosphate is a linear polyphosphate according to the formula $Na_nH_2P_nO_{3n+1}$ with a chain length of n=2 to 1500, preferably of n=15 to 100 and more preferably of 16-32.
5. Use of sodium phosphate according to embodiment 3, wherein the polymeric sodium metaphosphate is a linear polyphosphate according to the formula $Na_nH_2P_nO_{3n+1}$ with a chain length of n=36-72.
6. Use of sodium phosphate according to embodiment 3, wherein the polymeric sodium metaphosphate is a linear polyphosphate according to the formula $Na_nH_2P_nO_{3n+1}$ with a chain length of n=65-100.
7. Use of sodium phosphate according to any of embodiments 3 to 6, wherein the linear polyphosphate is provided in form of nanoparticles composed of said polyphosphate and divalent metal ions.
8. Use of a polyphosphate salt according to embodiment 1 or 2, wherein the polyphosphate is a cross-linked polyphosphate, and preferably a sodium salt thereof.
9. Use of a polyphosphate salt according to embodiment 1 or 2, wherein the polyphosphate is a metaphosphate, whereby the phosphate groups form a ring, and preferably a sodium salt thereof.
10. Use of a polyphosphate salt according to embodiment 9, wherein the ring-shaped metaphosphate is trimetaphosphate or hexametaphosphate, and preferably a sodium salt thereof.
11. Use of a polyphosphate salt according to embodiment 1 or 2, wherein the polyphosphate salt is an ultraphosphate as a highly condensed phosphate structure consisting of interconnected phosphate rings or interconnected linear chains or a mixture of both.
12. Use of polyphosphate salt according to embodiment 1 or 2, wherein the polyphosphate is a polyphosphate glass.
13. Use of polyphosphate according to embodiment 12, wherein the polyphosphate is a water-insoluble crystalline polymeric sodium metaphosphate also known as Maddrell's salt, Kurrol's salt or potassium Kurrol's salt
14. Use of a polyphosphate salt according to any of the embodiments 1 to 14, wherein the medical device or the pharmaceutical composition comprises fibroin.
15. A medical device comprising fibroin and a polyphosphate salt, whereby the polyphosphate salt is preferably a polyphosphate salt according to one of embodiments 1 to 13.
16. A medical device according to embodiment 15, whereby the polyphosphate is incorporated physically, chemically or enzymatically.
17. A device according to embodiment 15 or 16, whereby polyphosphate can be fully or partially entrapped in the fibroin component.
18. A device according to any of embodiments 15 to 17, whereby the product is selected from the group of spun or knitted fibers, non-woven, woven, sponge, foam, membrane, film, 3D scaffold, hydrogel, particles, and powder.
19. A medical device according to any of embodiments 15 to 18 for use in the treatment of wounds.

EXAMPLES

1. Preparation of a Fibroin Solution Based on Raw Silk from *Bombyx mori*

Degumming Process
 Provide 20 g cocoons per 2.5 l water
 Cut cocoons and grind in a blender
 Prepare a 0.03 mol $Na_2CO_3$:$H_2O$-solution
 boil the cocoons in the 0.03 mol $Na_2CO_3$ solution for 2 hours under stirring
 fill the dispersion into a sieve and rinse the silk wool with water
 Soak the silk wool in water
 Wring out the silk wool and dry it a room temperature for approx. 48 hours
Production of the Fibroin Solution
 In a 100 ml tube, add 5 g silk wool and 25 g solvent containing $CaCl_2$:Ethanol:$H_2O$ in a molar ratio of 1:3:10

Solubilization of fibroin by a microwave pulping:
Add 1.5 g silk wool to 8 g solvent containing $CaCl_2$: Ethanol:$H_2O$ in a molar ratio of 1:3:10 in a hermetically sealable, pressure-resistant container
Close the container airtightly
Subject to a microwave treatment with 70 Watt output power for 75 minutes yielding a temperature of 95° C.
Centrifuge for 45 minutes at 5000 rpm Dialysis
Prepare dialysis tubes (6-8 kDa) by pre-incubation in distilled water
Dialysis in distilled water for at least 36 hours
Change of dialysis solution when electrical conductivity exceeds 5
Dialysis is finished when a constant electrical conductivity of 50 is reached Concentration
Heating of the fibroin solution at 80-95° C. (under stirring in an open vessel
cool down to room temperature and storage in a refrigerator

2. Preparation of a Fibroin Product

2.1 Fibroin Sponge

Mix 6 ml Fibroin solution and 2 ml of a 4 Vol %-ethanolic water solution and let it freeze
After 36 hours, the solution is thawed for 1.5 hours and then re-frozen
Repeat the freeze-thaw cycle five times so that a sponge-like structure develops
Fibroin sponge can be removed from the solution and stored in a refrigerator

2.2 Fibroin-Membrane fill a petri plate with 15 ml fibroin solution
Drying for 36 hours horizontally on a balance plate
removal of the membrane by filling the plate with 40 ml of a 35 Vol % ethanolic water solution
Detaching of the membrane and storage in an aqua dest. solution in a refrigerator.

2.3 Fibroin-Non Woven by Electrospinning

The fibroin solution is processed in a spinning machine by using the following parameters:

| Fibroin-concentration | syringe volume | cannula diameter | Temperature | Rel. Humidity | flow rate |
|---|---|---|---|---|---|
| 30-60% | 1.5-100 ml | 0.2-1.08 mm | 10-80° C. | 5-40% | 0.1-1.0 ml/h |

DETAILED DESCRIPTION OF EMBODIMENTS

While the invention has been illustrated and described in detail in the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

Definitions

The term "hydrogel" refers to a three-dimensional (3D) crosslinked network of hydrophilic polymers that swell in water. In some embodiments, water can penetrate in between the polymer chains of the polymer network, subsequently causing swelling and the formation of a hydrogel. In general, hydrogels are superabsorbent. For example, in some embodiments, hydrogels can contain 50% or more, 60% or more, 70% or more, 80% or more, 90% or more, 95% or more, or 98% or more by weight of water. In some embodiments, a plurality of hydrogels can be assembled together to form a hydrogel assembly.

The invention claimed is:

1. A medical device comprising fibroin and a polyphosphate salt including a polyphosphate and a salt counter ion, and the medical device is selected from the group consisting of spun or knitted fibers, non-woven, woven, sponge, foam, membrane, film, 3D scaffold, particles, and powders; and
   wherein the polyphosphate salt is a polymeric sodium metaphosphate being a linear polyphosphate according to the formula $Na_nH_2P_nO_{3n+1}$ with a chain length of n=65-100.

2. The medical device according to claim 1, wherein the fibroin is derived from Lepidoptera and is a sericin-free fibroin.

3. The medical device according to claim 2, wherein the fibroin is derived from *Bombyx mori*.

4. The medical device according to claim 1, wherein the polyphosphate is incorporated physically, chemically or enzymatically.

5. The medical device according to claim 1, wherein the polyphosphate is fully or partially entrapped in the fibroin component.

6. A medical device comprising fibroin and a polyphosphate salt including a polyphosphate and a salt counter ion, and the medical device is selected from the group consisting of spun or knitted fibers, non-woven, woven, sponge, foam, membrane, film, 3D scaffold, particles, and powders; and
   wherein the polyphosphate salt is a polymeric sodium metaphosphate being a linear polyphosphate according to the formula $Na_nH_2P_nO_{3n+1}$ with a chain length of n=2 to 1500, and the linear polyphosphate is provided in form of nanoparticles composed of said polyphosphate and divalent metal ions.

7. The medical device according to claim 6, wherein the fibroin is derived from Lepidoptera and is a sericin-free fibroin.

8. The medical device according to claim 7, wherein the fibroin is derived from *Bombyx mori*.

9. The medical device according to claim 6, wherein the polyphosphate is incorporated physically, chemically or enzymatically.

10. The medical device according to claim 6, wherein the polyphosphate is fully or partially entrapped in the fibroin component.

11. A medical device comprising fibroin and a polyphosphate salt including a polyphosphate and a salt counter ion, and the medical device is selected from the group consisting of spun or knitted fibers, non-woven, woven, sponge, foam, membrane, film, 3D scaffold, particles, and powders; and
    wherein the polyphosphate salt is a polymeric sodium metaphosphate being a linear polyphosphate according to the formula $Na_nH_2P_nO_{3n+1}$ with a chain length of n=36-72.

12. The medical device according to claim 11, wherein the polyphosphate is incorporated physically, chemically or enzymatically.

13. The medical device according to claim 11, wherein the polyphosphate is fully or partially entrapped in the fibroin component.

14. The medical device according to claim 11, wherein the fibroin is derived from Lepidoptera and is a sericin-free fibroin.

15. The medical device according to claim 14, wherein the fibroin is derived from *Bombyx mori*.

* * * * *